United States Patent [19]

Sullivan

[11] Patent Number: 5,454,618

[45] Date of Patent: Oct. 3, 1995

[54] AUTOMOTIVE SLIDING DOOR STOP FOR FUEL FILLER ACCESS LID

[75] Inventor: Brian K. Sullivan, Livonia, Mich.

[73] Assignee: Ford Motor Company, Dearborn, Mich.

[21] Appl. No.: 299,984

[22] Filed: Sep. 2, 1994

[51] Int. Cl.⁶ .............................. B60J 5/06; B60K 15/05
[52] U.S. Cl. .................. 296/97.22; 296/155; 180/286
[58] Field of Search ................... 296/97.22, 155, 296/223; 180/286, 287, 289

[56] References Cited

U.S. PATENT DOCUMENTS 4,620,744  11/1986  Yui et al. .

FOREIGN PATENT DOCUMENTS

| 0102481 | 3/1984 | European Pat. Off. . | |
|---|---|---|---|
| 2310224 | 10/1974 | Germany . | |
| 56-28019 | 3/1981 | Japan . | |
| 60-146723 | 8/1985 | Japan | 296/223 |
| 62-251232 | 11/1987 | Japan | 296/223 |

*Primary Examiner*—Dean Kramer
*Attorney, Agent, or Firm*—David B. Kelley; Roger L. May

[57] ABSTRACT

A sliding door stop device for a vehicle having a sliding door and a fuel filler access lid on the same side of the vehicle has a stop member mounted proximate a door track for a vehicle sliding door, the stop member having a first, obstructing position projecting into an inner portion of the track so as to obstruct movement of the sliding door along the track and a second, retracted position withdrawn from obstructing the track. Connection members, such as a cable, are connected between the stop member and the interior of a fuel filler access lid on the vehicle for moving the stop member to the obstructing position when the access lid is opened to prevent collision of the sliding door with the access lid, and to the retracted position when the access lid is closed so as not to obstruct movement of the sliding door within the door track.

19 Claims, 5 Drawing Sheets

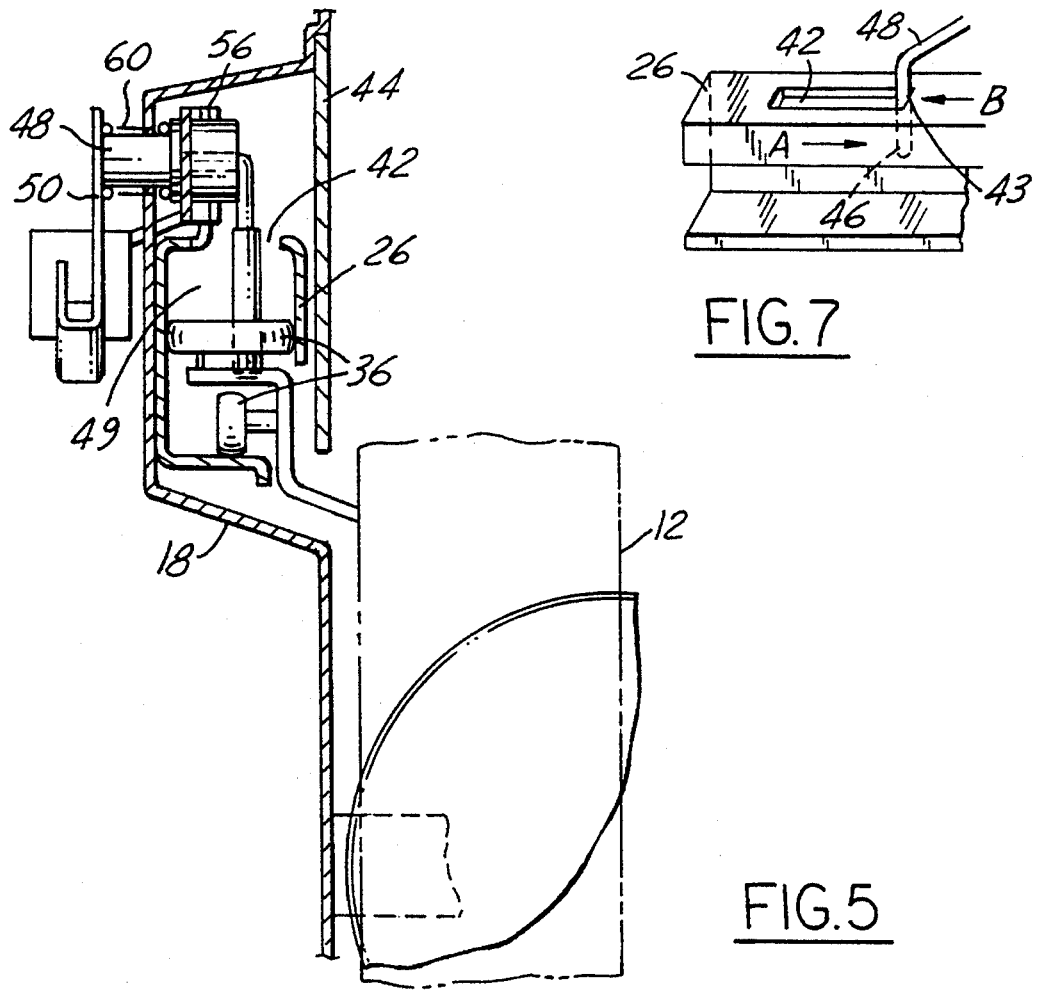
FIG.7
FIG.5
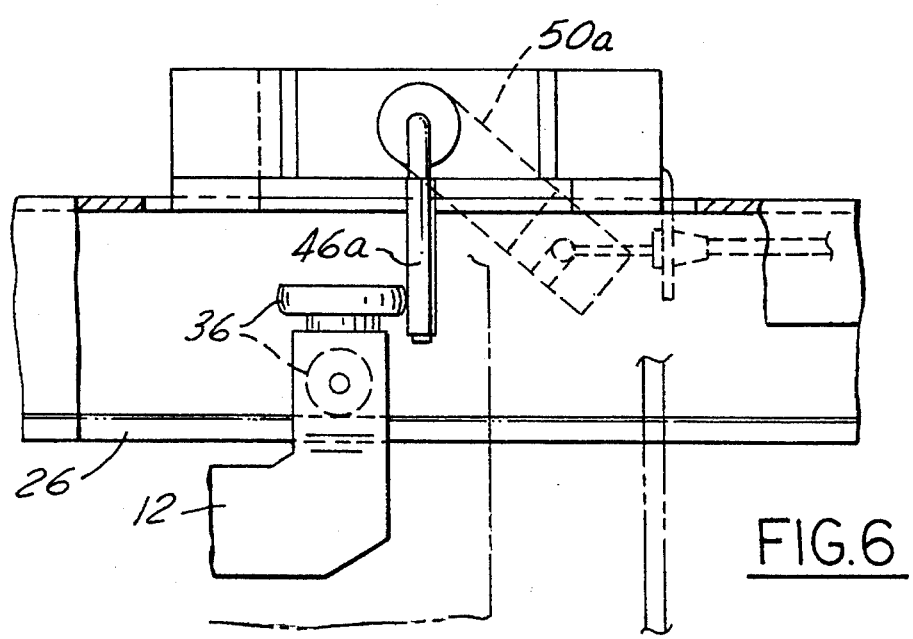
FIG.6

AUTOMOTIVE SLIDING DOOR STOP FOR FUEL FILLER ACCESS LID

FIELD OF THE INVENTION

The present invention relates to mechanisms for stopping a vehicle sliding door, and, more particularly, to a stop mechansim for preventing an automotive sliding door from colliding with a fuel filler access lid during refueling.

BACKGROUND OF THE INVENTION

Various vehicle types have sliding doors for allowing entry and egress of passengers, parcels and other items to be hauled or transported. Sliding doors, which are commonly used on vans, offer the advantage of allowing wider access to a vehicle entrance space than a conventional hinge mounted door and, perhaps more importantly, do not extend nearly as far into the adjacent area around the vehicle thus decreasing the number and severity of door induced dents and dings.

An automotive sliding door typically has two or three sets of rollers mounted within corresponding longitudinally oriented tracks. For example, an upper track is located above the sliding door entrance way, a center track is located between the rear quarter panel and the inside rear trim panel, and a lower track is situated below the entrance way. As the door is unlatched and pushed rearward, it is routed by the tracks slighty outward of the vehicle exterior and slides adjacent to the rear quarter panel.

Conventional vehicle design practice is to place the sliding door on the side of the vehicle opposite the driver's side, and to locate a filler pipe access lid on the driver's side rear quarter panel. Such a design avoids a collision between the sliding door and the filler pipe access lid if the access lid is open for refueling and the sliding door is subsequently opened.

Some vehicles, however, may have the sliding door and the access lid on the same side of the vehicle, or may have sliding doors on both sides of the vehicle. In either case, the potentiality exists for the aforementioned collision between the sliding door and the access lid.

One mechanism for preventing such an undesirable collision is shown in Japanese patent 56-28019, where the access lid 6 is supported by inner fold-out lids 7 and 8 which are pulled outward via finger opening 9. Lid 6 serves as a stop to prevent door 1 from disrupting a fuel nozzle inserted into the filler pipe. A drawback of this approach is that door 1 will cause chipping, nicking, and denting of lid 6 upon collisiion therewith thus degrading vehicle external appearance.

Another mechanism for preventing the above described problem is disclosed in U.S. Pat. No. 4,620,744 (Yui, et al.) wherein the mechanism has a pivoted fuel lid 17, a lever 23, a second lever 29 actuated by a rod 24, and a stop 12 carried by a sliding door 11. When the lid is open, the lever is positioned against the stop to prevent the door from sliding and contacting the lid when the fuel tank is being filled. This mechanism, however, requires opening the fuel filler lid and then pulling the lever to lock-out the sliding door, an inconvenient extra step. In addition, the mechanism only allows the door to open a short way and also requires many parts which increase both manufacturing expense and assembly time.

SUMMARY OF THE INVENTION

An object of the present invention is to provide a vehicle sliding door lock-out device which overcomes the aforementioned problems and drawbacks of prior mechanisms.

Another object is to provide a sliding door lock-out device which does not require extra means to allow the sliding door to close if the fuel filler access lid is opened after the sliding door is opened.

A further object of the present invention is to provide a sliding door lock-out device which can be inexpensively manufactured and easily assembled.

Another advantage is that the sliding door lock-out device of the present invention is hidden from exterior view.

Still another advantage is that the lock-out device is installed in the center sliding door track thus making installation easier than devices mounted on the lower track which require workers to bend over.

A feature of the present invention is a sliding door lock-out device mounted near the sliding door center track which is activated by the motion of the filler door access lid.

Another feature is a cable take-up device attached to the access lid to allow some initial door travel without operating the lock-out device of the present invention.

The above objects, advantages and features are achieved by providing a sliding door stop device for a vehicle comprising a stop member mounted proximate a door track for a vehicle sliding door, the stop member having a first position projecting into an inner portion of the track so as to obstruct movement of the sliding door along the track and a second position retracted from obstructing said track. Connection means, such as a cable, are connected between the stop member and the interior of a fuel fill access lid on the vehicle for moving the stop member to the first position when the access lid is opened and to the second position when the access lid is closed.

In a preferred embodiment, a lever is attached to the stop member having first and second lever positions corresponding to said first and second positions of said stop member. Bias means, such as a coil spring, are attached to the lever for biasing it to the second lever position. A cable is connected at a first end to the lever and at a second end to the interior of the fuel fill access lid, or a cable take-up type bracket mounted thereon. When the access lid is opened, the cable pulls the lever against the force of the bias means to the first lever position so that the stop member is moved to the first position obstructing the rollers on the sliding door from sliding in the center door track. When the access lid is closed, the bias means biases the lever to the second lever position so that the stop member returns to the second position. The vehicle sliding door is thus prevented from sliding past the stop member when the fuel filler access door is opened for refueling, but not prevented from sliding completely open otherwise.

BRIEF DESCRIPTION OF THE DRAWINGS

FIG. 5 is a cross-sectional end view of a vehicle sliding door track showing the rollers of a sliding door therein as obstructed by a sliding door stop according to a preferred embodiment of the present invention mounted in proximity to the sliding door track.

FIG. 6 is a side cross-sectional view of a vehicle sliding door track showing the rollers of a sliding door therein as obstructed by a sliding door stop according to a preferred embodiment of the present invention.

FIG. 7 is a schematic diagram of opposing forces on a sliding door stop according to a preferred embodiment of the present invention shown in a position to obstruct movement through a sliding door track.

DETAILED DESCRIPTION OF THE PREFERRED EMBODIMENT

Figure 1:
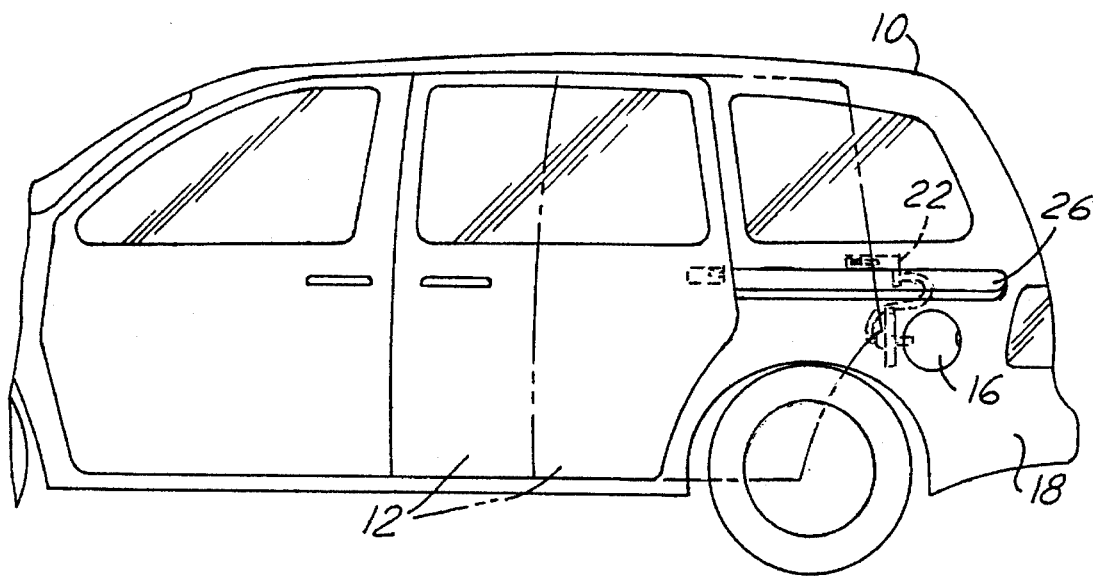
FIG. 1 is a side view of a vehicle body having a sliding door and a fuel filler access lid on the same side of the vehicle body and showing the location of a sliding door stop according to a preferred embodiment of the present invention.
Figure 2:
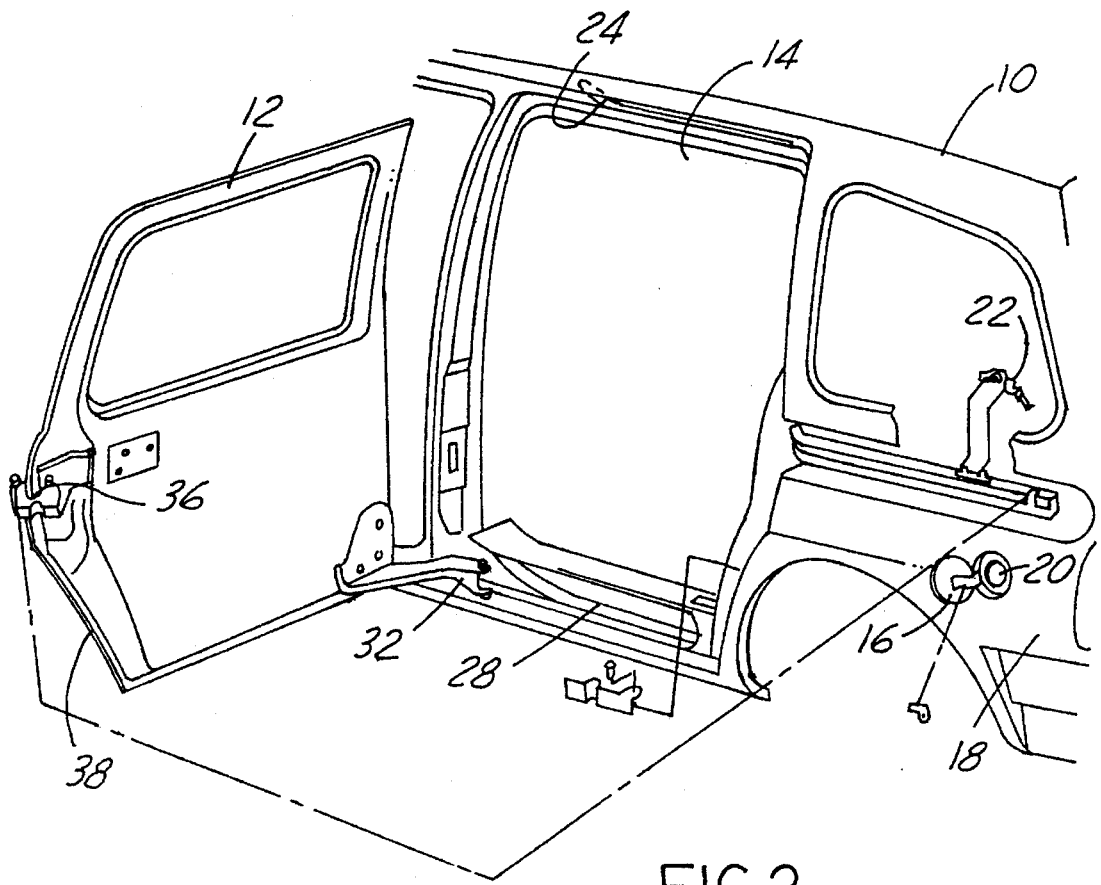
FIG. 2 is a perspective side view of a vehicle entrance way and an adjacent rearward vehicle body section showing the relative locations of a sliding door, the sliding door tracks, the fuel filler access lid, and a sliding door stop according to a preferred embodiment of the present invention.

Referring now to FIGS. 1 and 2, a vehicle body 10, for example in a van, has a sliding door 12 along a side thereof for alternately covering and uncovering passage way 14 (FIG. 2) to allow entry and egress therefrom. Fuel filler access lid 16 on rear quarter panel 18 allows access to filler pipe 20 during refueling. If access lid 16 is opened for refueling and door 12 is slid open to uncover passage way 14, a collision will occur unless access lid 16 is shut or door 12 is stopped (FIG. 1). Since a fuel pump filler nozzle (not shown) may be in filler pipe 20 when door 12 is opened, it is impractical to shut access lid 16 in such a situation. The present invention, therefore, provides a sliding door stop device 22 connected to access lid 16 for obstructing movement of sliding door 12 when access lid 16 is open to thereby prevent the abovedescribed collision between access lid 16 and sliding door 12.

Before more fully describing the present invention, a brief description of sliding door 12 operation will be useful in understanding sliding door stop device 22. As seen in FIG. 2, an automotive sliding door 12 typically has an upper track 24 located above passage way 14, a center track 26 located on rear quarter panel 18, and a lower track 28 situated below passage way 14. Rollers 30 and 32 are mounted on door 12 at upper and lower areas of forward section 34, respectively, to guide door 12 along corresponding longitudinally oriented tracks 24 and 28, respectively. Door 12 also has a set of rollers 36 mounted at a rear section 38 which sliding engage with center track 26. As door 12 is unlatched and pushed rearward, it is routed by rollers 30, 32 and 36 within tracks 24, 26 and 28, respectively, slighty outward of vehicle body 10 exterior and slides adjacent to rear quarter panel 18. Thus, device 22 is provided to stop sliding door 12 in its tracks 24, 26, and 28 before colliding with fuel filler access lid 16.

Figure 3:
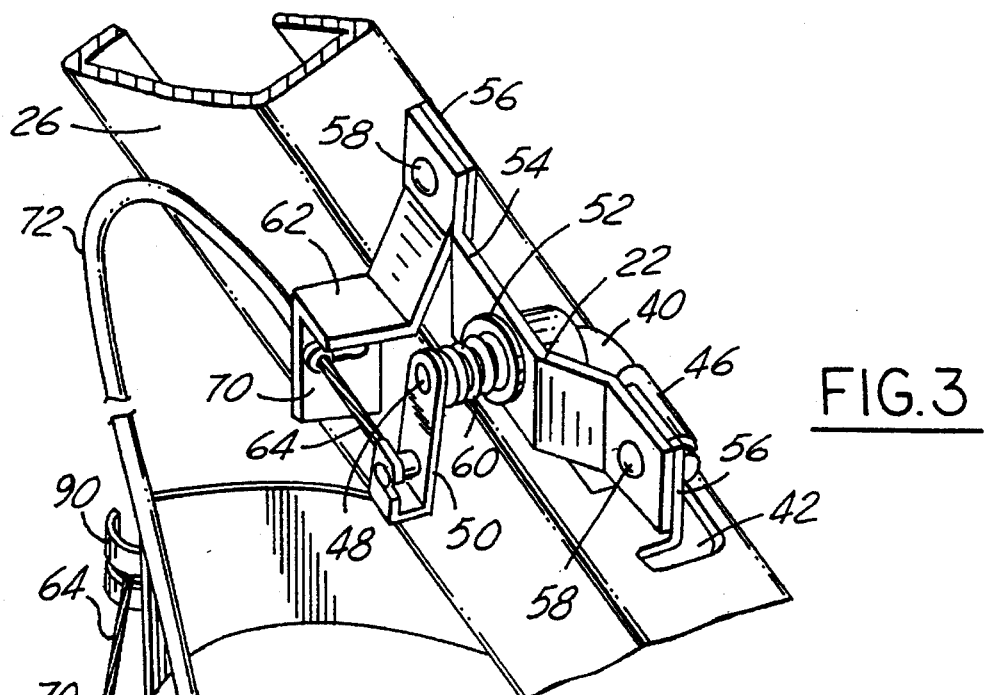
FIG. 3 is a perspective view of a sliding door stop according to a preferred embodiment of the present invention shown mounted above a vehicle sliding door track.
Figure 4:
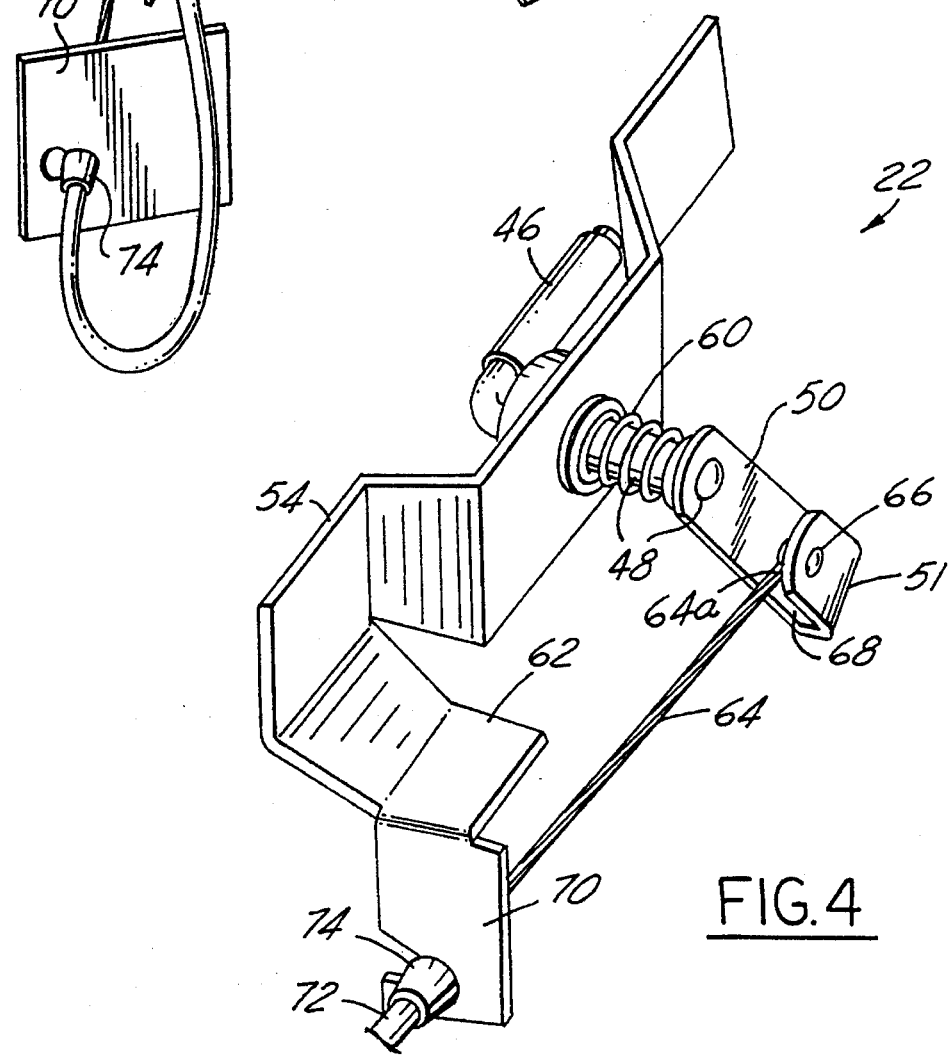
FIG. 4 is a perspective view of a sliding door stop according to a preferred embodiment of the present invention.
Figure 8:
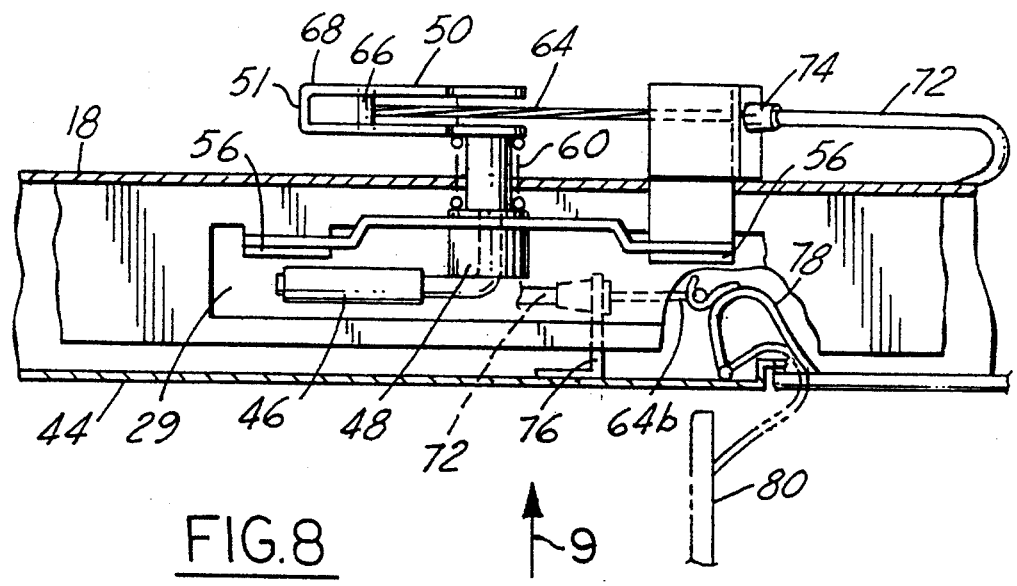
FIG. 8 is a top view of a sliding door stop according to a preferred embodiment of the present invention shown mounted above a vehicle sliding door track.
Figure 9:
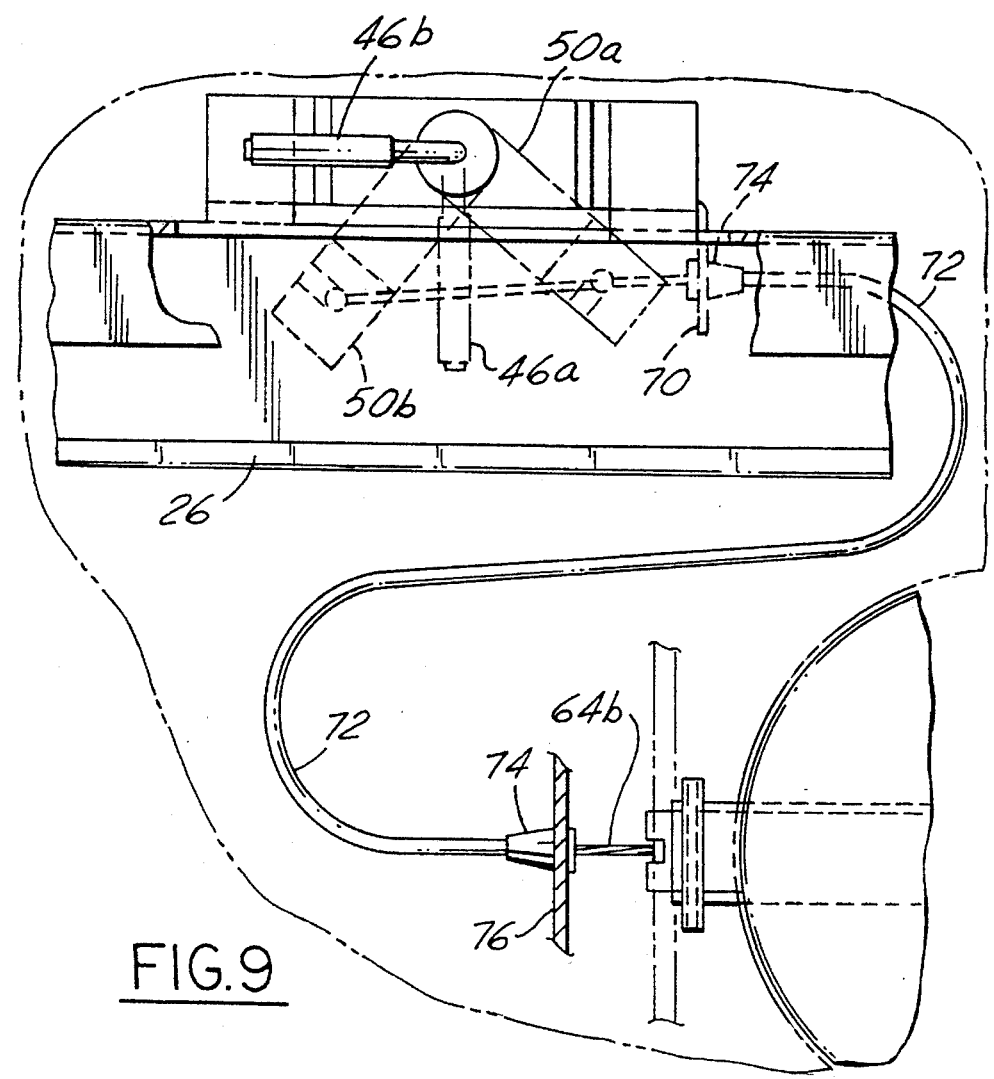
FIG. 9 is schematic view of a sliding door stop according to a preferred embodiment of the present invention showing connection to a fuel filler access lid.

A preferred embodiment of the present invention will now be described with reference to FIGS. 3 through 9. As seen in FIG. 3, device 22 has stop member 40 mounted above opening 42 in center door track 26 at a location so as to stop door 12 before colliding with access lid 16, as is further described below. Center door track 26 is positioned between shield 44 and rear quarter panel 18, as best seen in FIG. 5. Stop member 40 is comprised of rod 46 and shaft 48 connected thereto at approximately a 90° angle (FIG. 4). Preferably, stop member 40 is a solid piece with a 90° bend having rod 46 on one side of the bend and shaft 48 on the other side. Shaft 48 rotates rod 46 between a first position 46a (FIG. 9) projecting through opening 42 into inner portion 49 of center track 26 so as to obstruct movement of rollers 36 along center track 26 (FIGS. 5 and 6), and a second position 46b retracted from opening 42 (FIG. 9).

Movement of rod 46 between its obstructing and retracted position is accomplished by lever 50 attached to shaft 48 (FIGS. 3 and 4). Lever 50 can be shifted between a first lever position 50a and a second lever position 50b corresponding to the first and second rod positions, 46a and 46b, respectively (FIG. 9) as discussed below with regard to opening and closing of access lid 16. Shaft 48 passes through aperture 52 in bracket 54 so that the assembly of stop member 40 and lever 50 can be mounted to flanges 56 protruding from center track 26 by rivets 58 (FIGS. 3, 5, and 8). Shaft 48 passes through rear quarter panel 18 to an inner side of rear quarter panel 18 (FIGS. 5 and 8).

Coil spring 60 is mounted coaxially around shaft 48 between bracket 54 and lever 50 for torsionally biasing lever 50 to the second lever position 50b so that rod 46 is biased toward the retracted position 46b (FIGS. 3 and 4).

When in first position 46a, rod 46 is prevented from being pushed out of the path of rollers 36 by pushing against end 43 of opening 42, as seen in FIG. 7. A force A exerted by rollers 36 on rod 46 is countered by opposite acting force B from end 43 of opening 42. Bracket 54 absorbs residual torque from rotation of rod 46 by lever 50.

Movement of lever 50 between first and second lever positions 50a and 50b is accomplished by connection to cable 64, as best seen in FIG. 4. Cable 64 has first end 64a coupled with bead 66 thereon for rotatable movement with lever 50 in a manner known to those skilled in the art and suggested by this disclosure. U-shaped section 68 is provided on end 51 of lever 50 to accomodate movement of cable 64 as lever 50 rotates between first and second lever positions 50a and 50b (FIGS. 4 and 8).

Cable 64 passes through sheath brace 70 which juts downward from bracket extension 62, which projects from bracket 54. Cable sheath 72 is fixed to the opposite side of sheath brace 70 by grommet 74 (FIGS. 3 and 4). Sheath 72 is routed to stanchion plate 76 near access lid 16, as seen in FIGS. 3, 8 and 9.

Figure 10A:
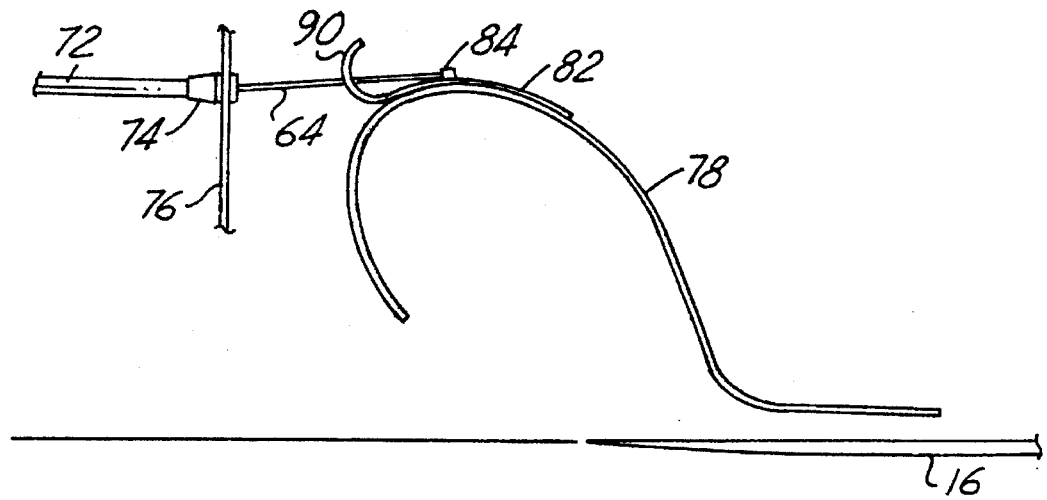
FIG. 10A is a schematic view of a fuel filler access lid shown in the closed position and having a hinge with a cable take-up bracket attached thereto for pulling a cable connected to a sliding door stop according to a preferred embodiment of the present invention.
Figure 10B:
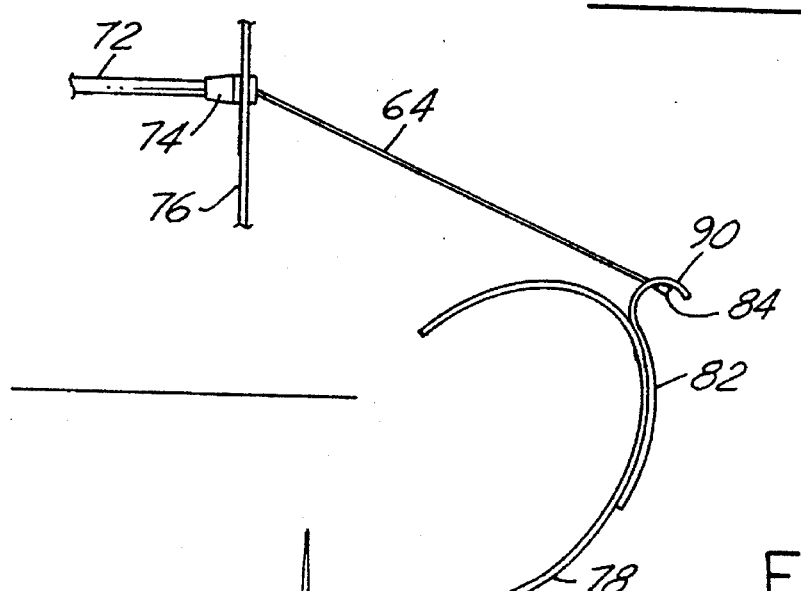
FIG. 10B is a schematic view of a fuel filler access lid similar to FIG. 10A but shown in the open position with a cable take-up bracket extended so as to pull the cable through a sheath.

After emerging from sheath 72 at plate 76, second end 64b of cable 64 is attached to access lid hinge 78 on interior 80 of access lid 16 (FIGS. 8, 10A and 10B). Hinge 78 has cable take-up section 82 attached thereto to which second end 64b of cable 64 is attached via bead 84 (FIG. 10A). Take-up section 82 allows access lid 16 to open a predetermined distance before pulling on cable 64 to activate lever 50 to the first lever position 50a. This feature is important since access lid 16 may have greater rotational movement than is necessary to rotate lever 50 between the first and second lever positions 50a and 50b.

Figure 10C:
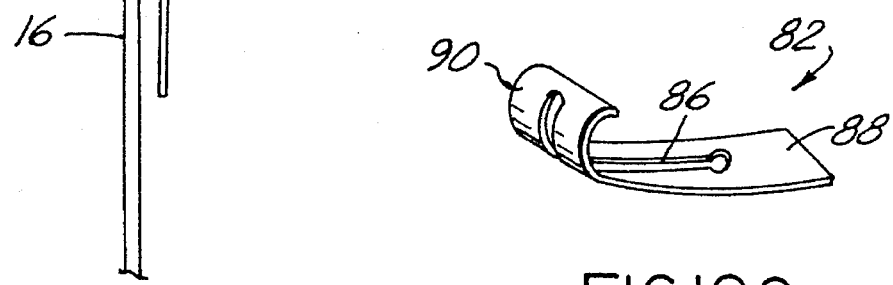
FIG. 10C is a perspective view of a cable take-up bracket attached to a fuel filler access door hinge for allowing some initial access lid travel without operating the lock-out device of the present invention.

Preferably, cable take-up section 82 has cable end receiving slot 86 in a middle portion thereof extending longitudinally from first end 88 to curled portion 90 at the other end thereof (FIG. 10C). Bead 84 serves to guide second cable end 64b within slot 86. When access lid 16 is closed, bead 84 is positioned at first end 88 (FIG. 10A), and when the access lid is opened a predetermined distance, bead 84 is taken up by curled portion 90 to put cable 64 in tension (FIG. 10B).

In operation, when access lid 16 is opened, cable 64 pulls lever 50 against the force of coil spring 60 to the first lever position 50a so that shaft 48 rotates rod 46 to the first position 46a, which obstructs inner section 49 of center track 26 so that rollers 36 cannot move past (FIG. 6), thus preventing a collision between sliding door 12 and access lid 16. When access lid 16 is closed, coil spring 60 biases lever 50 to the second lever position 50b so that rod 46 returns to the second position 46b (FIG. 9). Rollers 36 of sliding door 12 can thus move freely within center track 26.

Although the preferred embodiment of the present invention has been disclosed, various changes and modifications may be made without departing from the scope of the invention as set forth in the appended claims.

I claim:

1. A sliding door stop device for a vehicle comprising:

a stop member mounted proximate a door track for a vehicle sliding door, said stop member having a first position projecting into an inner portion of said track so as to obstruct movement of said sliding door along said track, and a second position retracted from obstructing said track; and connection means connected between said stop member and the interior of a fuel fill access lid on said vehicle for moving said stop member to said first position when said access lid is opened and to said second position when said access lid is closed.

2. A sliding door stop device according to claim 1 wherein said connection means comprises:

a lever attached to said stop member having first and second lever positions corresponding to said first and second positions of said stop member;

bias means attached to said lever for biasing said lever to said second lever position; and a cable with a first end connected to said lever and a second end connected to the interior of said fuel fill access lid such that when said access lid is open said cable pulls said lever against the force of said bias means to said first lever position so that said stop member moves to said first position, and when said access lid is closed said bias means biases said lever to said second lever position so that said stop member returns to said second position.

3. A sliding door stop device according to claim 2 wherein said bias means comprises a coil spring.

4. A sliding door stop device according to claim 3 wherein said stop member comprises a rod portion movable to said first and second positions, and a shaft connected to said rod portion and having said lever mounted thereon for rotatable movement therewith.

5. A sliding door stop device according to claim 4 wherein a stop member support bracket is mounted to the interior of a rear quarter panel of said vehicle above an opening in said door track so that when said stop member is in said first position, said rod portion enters the interior of said track through said opening to obstruct movement of said door, and when said stop member is in said second position, said rod portion is retracted through said opening.

6. A sliding door stop device according to claim 5 wherein said shaft extends from said rod portion through said bracket to said lever so that rotational movement of said lever about the axis of said shaft rotates said rod portion between said first and second positions.

7. A sliding door stop device according to claim 6 wherein said coil spring is mounted coaxially with said shaft between said bracket and said lever.

8. A sliding door stop device according to claim 2 wherein a cable connection bracket is attached to the interior of said fuel filler access lid, said bracket having a cable take-up section connected to said second end of said cable for allowing said access lid to open a predetermined distance before pulling on said cable to activate said lever to said first lever position.

9. A sliding door stop device according to claim 8 wherein said cable take-up section is a sled shaped member having a cable end receiving slot in a middle portion thereof extending longitudinally from a first end of said sled shaped member into a curled portion at the other end of said sled shaped member, the second end of said cable having a bead attached thereto to guide said second end within said slot so that when said access lid is closed, said bead is positioned at said first end of said sled shaped member, and when said access lid is opened said predetermined distance, said bead is taken up by said curled portion to put said cable into tension.

10. A sliding door stop device for an automotive vehicle comprising:

(1) a stop member mounted proximate a center door track for a vehicle sliding door, the stop member movable between:

(a) a first position projecting into an inner portion of the track so as to obstruct movement of door rollers on the sliding door along the track, and (b) a second position retracted from obstructing the track; and (2) connection means connected between the stop member and the interior of a fuel fill access lid on the vehicle, the connection means comprising:

(a) a lever attached to the stop member having first and second lever positions corresponding to the first and second positions of the stop member;

(b) bias means attached to the lever for biasing the lever to the second lever position; and (c) a cable with a first end connected to the lever and a second end connected to the interior of the fuel fill access lid such that when the access lid is open the cable pulls the lever against the force of the bias means to the first lever position so that the stop member is in the first position, and when the access lid is closed the bias means biases the lever to the second lever position so that the stop member is in the second position.

11. A sliding door stop device according to claim 10 wherein the bias means is a coil spring.

12. A sliding door stop device according to claim 11 wherein the stop member comprises:

(1) a rod movable between the first and second positions, and (2) a shaft connected to the rod and having the lever mounted thereon for rotatable movement therewith.

13. A sliding door stop device according to claim 12 wherein a stop member support bracket is mounted to the interior of a rear quarter panel of the vehicle above an opening in the door track so that when the stop member is in the first position, the rod portion enters the interior of the track through the opening to obstruct movement of the door, and when the stop member is in the second position, the rod portion is retracted through the opening.

14. A sliding door stop device according to claim 13 wherein the shaft extends from the rod portion through the bracket to the lever so that rotational movement of the lever about the axis of the shaft rotates the rod portion between the first and second positions.

15. A sliding door stop device according to claim 14 wherein the coil spring is mounted coaxially around the shaft between the bracket and the lever.

16. A sliding door stop device according to claim 10 wherein a cable connection bracket is attached to the interior of the fuel filler access lid, the bracket having a cable take-up section connected to the second end of the cable for allowing the access lid to open a predetermined distance before pulling on the cable to activate the lever to the first lever position, the cable take-up section having a cable end receiving slot in a middle portion thereof extending longitudinally from a first end to a curled portion at the other end thereof, the second end of the cable having a bead attached thereto to guide the second end within the slot so that when the access lid is closed, the bead is positioned at the first end of the sled shaped member, and when the access lid is opened the predetermined distance, the bead is taken up by the curled portion to put the cable in tension.

17. A sliding door stop device for an automotive vehicle comprising:

(1) a stop member mounted above an opening in a center door track for a vehicle sliding door, the stop member comprising:

(a) a rod movable between a first position projecting through the opening into an inner portion of the track so as to obstruct movement of door rollers on the sliding door along the track, and a second position retracted from the opening; and (b) a shaft connected to the rod for rotating the rod between the first and second positions;

(2) a lever attached to the shaft and having first and second lever positions corresponding to the first and second positions of the rod;

(3) a coil spring mounted coaxially around the shaft between the bracket and the lever for biasing the lever to the second lever position;

(4) a cable having first and second ends, with the first end connected to the lever; and (5) a cable connection bracket attached to the interior of the fuel filler access lid with the second end of the cable attached thereto so that when the access lid is opened the cable pulls the lever against the force of the coil spring to the first lever position so that the shaft rotates the rod to the first position, and when the access lid is closed the coil spring biases the lever to the second lever position so that the rod returns to the second position.

18. A sliding door stop device according to claim 17 wherein the cable connection bracket has a cable take-up section to which the second end of the cable is attached for allowing the access lid to open a predetermined distance before pulling on the cable to activate the lever to the first lever position.

19. A sliding door stop device according to claim 18 wherein the the cable take-up section has a cable end receiving slot in a middle portion thereof extending longitudinally from a first end to a curled portion at the other end thereof, the second end of the cable having a bead attached thereto to guide the second end within the slot so that when the access lid is closed, the bead is positioned at the first end of the cable take-up section, and when the access lid is opened the predetermined distance, the bead is taken up by the curled portion to put the cable in tension.

* * * * *